US007367686B2

(12) United States Patent
Rohlfing et al.

(10) Patent No.: US 7,367,686 B2
(45) Date of Patent: May 6, 2008

(54) POSITION LAMP FOR USE WITH WATERCRAFT AND ASHORE AND HAVING MULTIPLE LIGHT SOURCES

(75) Inventors: Ralph Rohlfing, Weyhe (DE); Wolfgang Serfass, Bremen (DE)

(73) Assignee: Aqua Signal Aktiengesellschaft, Bremen (DE)

( * ) Notice: Subject to any disclaimer, the term of this patent is extended or adjusted under 35 U.S.C. 154(b) by 152 days.

(21) Appl. No.: 11/251,380

(22) Filed: Oct. 14, 2005

(65) Prior Publication Data

US 2007/0086186 A1 Apr. 19, 2007

(51) Int. Cl.
*F21V 5/04* (2006.01)
*F21V 29/00* (2006.01)
*B60Q 1/26* (2006.01)

(52) U.S. Cl. ...................... 362/240; 362/267; 362/477; 362/800

(58) Field of Classification Search ................ 362/240, 362/235, 236, 241, 244, 245, 247, 267, 269, 362/477
See application file for complete search history.

(56) References Cited

U.S. PATENT DOCUMENTS 3,875,561 A * 4/1975 Scarpino et al. ............ 340/472
5,769,532 A * 6/1998 Sasaki ........................ 362/237
5,931,570 A * 8/1999 Yamuro ...................... 362/355
6,030,099 A 2/2000 McDermott
6,273,588 B1 8/2001 Arakelian
6,424,269 B1 * 7/2002 Pederson ............... 340/815.45
6,695,462 B2 * 2/2004 Rohlfing et al. ............ 362/328
7,111,961 B2 * 9/2006 Trenchard et al. .......... 362/235
7,270,449 B2 * 9/2007 Uke ........................... 362/350

FOREIGN PATENT DOCUMENTS

GB 2 400 903 A 10/2004

* cited by examiner

*Primary Examiner*—Y Quach Lee
*Assistant Examiner*—Leah S. Lovell
(74) *Attorney, Agent, or Firm*—Laurence P. Colton; Smith, Gambrell & Russell

(57) ABSTRACT

A position lamp for watercraft or for placing ashore, in particular a multicolored lamp, having light to be emitted in at least two different directions and at least one light source per direction, the light passing optically refractive elements, and in which a dedicated optically refractive element is provided per light source, the optically refractive elements being held on a common housing body, the housing body also accommodating the light sources.

21 Claims, 7 Drawing Sheets

POSITION LAMP FOR USE WITH WATERCRAFT AND ASHORE AND HAVING MULTIPLE LIGHT SOURCES

BACKGROUND OF THE INVENTION

1. Technical Field

The invention relates to a position lamp for watercraft or for placing ashore, in particular a multicolored lamp, having light to be emitted in at least two different directions and at least one light source per direction, the light passing optically refractive elements. Position lamps are also called navigation lamps in Germany.

2. Prior Art

It is known to use 2-color lamps or 3-color lamps, at least for smaller watercraft, green light being emitted front right in the direction of travel, red light being emitted front left in the direction of travel, and white light being emitted rearwards (3-color lamp). The light sources and optically refractive elements must be arranged and aligned precisely relative to one another, in order to be able to illuminate accurately the angular ranges prescribed by statute. The present invention aims to facilitate and/or improve the said arrangement of the light sources and optically refractive elements.

BRIEF SUMMARY OF THE INVENTION

The position lamp according to the invention is characterized in that a dedicated optically refractive element is provided per light source, and in that the optically refractive elements are held on a common housing body, the housing body also accommodating the light sources. The housing body therefore serves as a base for the light sources and the optically refractive elements and is of solid or at least semisolid design with stable walls on which the light sources or optically refractive elements can be arranged and/or fastened with high accuracy. Consequently, the precise production of the housing body already suffices to ensure it is possible to produce a position lamp which meets the statutory regulations extremely accurately. The relative arrangements of the light sources and optically refractive elements with regard to one another are fixed by the shape and/or design of the housing body. The housing body is preferably produced from aluminium or another thermally conductive metal and/or an alloy, since the waste heat of the light sources is also intended to be dissipated via the housing body. Provided, in particular, as light sources are LEDs, preferably one LED per color and/or precisely one LED for each optically refractive element.

According to a further idea of the invention, the housing body has a dedicated support surface for each optically refractive element. The angles between the support surfaces then essentially also define the angles between the individual light sources.

According to a further idea of the invention, the support surfaces each have approximately in the middle an opening and/or recess or depression, particularly for the passage and/or for the insertion of a printed circuit board with LED (or another luminous means), for leads or other components.

According to a further idea of the invention, the optically refractive elements have projections which enter the openings and/or recesses and thus ensure the arrangement of the optically refractive elements in defined positions relative to the housing body. The openings are preferably provided with edges against which corresponding edges or surfaces of the projections bear such that the optically refractive elements cannot move laterally, that is to say parallel to the support surfaces.

According to a further idea of the invention, the position lamp is characterized by screens for covering side areas of the optically refractive elements. The light exit areas are set accurately in accordance with the statutory regulations via the size and shape of the screens. Different screens can be used depending on regulation and country.

According to a further idea of the invention, it is provided that at least one of the screens is arranged between two optically refractive elements and covers neighbouring side areas of these two optically refractive elements.

Lenses are preferably provided as optically refractive elements. In the case of 2-color or 3-color lamps, at least two lenses can be of identical design in each case. Again, the lenses turn out to be correspondingly smaller than is the case with a single optically refractive element for the entire position lamp. The lenses are preferably designed on one side for bearing against the support surfaces.

According to a further idea of the invention, between the support surfaces the housing body has recesses for accommodating projections provided on the screens. The screens are held, at least accurately positioned, in the recesses between the support surfaces with the aid of the projections.

According to a further idea of the invention, it is provided that the recesses between the support surfaces are slots, and in that the projections are, in particular, extensions. The extensions enter the slots. It is therefore impossible for the screens to twist. There are respectively narrow areas which extend in a vertical direction in the case of customary 3-color lamps between the bearing surfaces. The slots also correspondingly run in a vertical direction and, at the same time, into the housing body, approximately in the direction of an imaginary middle of the housing body.

According to a further idea of the invention, at least one of the screens has a T-shaped cross section with three extensions, specifically one plug-in extension and two covering extensions. The plug-in extension can be plugged in to the associated slot in the housing body, while the covering extensions cover side areas of the optically refractive elements to the extent this is required.

According to a further idea of the invention, a heat sink is provided below or above the housing body and bearing against the latter. The heat sink is preferably of disc-shaped design and serves for dissipating and/or distributing the lost heat of the light sources and absorbed by the housing body.

According to a further idea of the invention, the heat sink has recesses or slots for the entry of parts of screens. The recesses or slots in the heat sink correspond to the recesses or slots in the housing body, but are arranged at right angles thereto. In the case of screens of T-shaped configuration, the plug-in extensions and covering extensions are thus also guided laterally.

The position lamp according to the invention can be coupled to a further position lamp, for example to a top light or an anchor light. Here, this additional position lamp has a light exit, substantially across a plane, which is circumferential or at least covers a wide angle, and having an LED as light source and an optically refractive element for deflecting and distributing the light, the LED being arranged with a principal radiation direction perpendicular to the light exit plane. Such a lamp is known, for example, from the Applicant's DE 198 34 520. The optically refractive element is of annular design there. The aim of the present invention is to provide an alternative embodiment.

It is provided according to the invention that the optically refractive element is of solid cylindrical design with a light entry surface at one end, a circumferential light exit surface, and with a reflective surface opposite the light entry surface, the reflective surface being formed by a funnel-shaped/V-shaped depression at an end opposite the light entry surface.

It goes without saying that the position lamp defined above can also be used independently of the invention outlined at the beginning or earlier, and also constitutes an independent invention.

The light entry surface is advantageously of convex design. Owing to the convex configuration of the light entry surface, the light emitted by the LED is introduced into the optically refractive element in a targeted fashion and at defined angles.

According to a further idea of the invention, the light entry surface is at the same time the bottom of a cylindrical depression in the optically refractive element, the LED dipping at least partially into the depression. Consequently, the optically refractive element has the reflective surface at one end, and the cylindrical depression with the light entry surface as bottom at the other end.

According to a further idea of the invention, the optically refractive element is covered by an opaque lid at the end opposite the light entry surface, in particular a circumferential covering wall bearing against a circumferential edge of the funnel-shaped/V-shaped depression. The intention is that as far as possible no light is to exit from the funnel-shaped depression defining the reflective surface. Light which possibly exits is shaded by the abovementioned circumferential covering wall. Moreover, the circumferential covering wall can dissipate heat from the optically refractive element via the circumferential edge of the funnel-shaped depression, and fix the edge laterally. In a corresponding way, the lid is preferably produced from aluminium or another thermally conductive metal or an alloy.

BRIEF DESCRIPTION OF THE DRAWINGS

Further features of the invention follow in addition from the description and from the claims. Advantageous exemplary embodiments of the invention are explained below in more detail with the aid of drawings, in which:

DETAILED DESCRIPTION OF THE PREFERRED EMBODIMENTS

Figure 1:
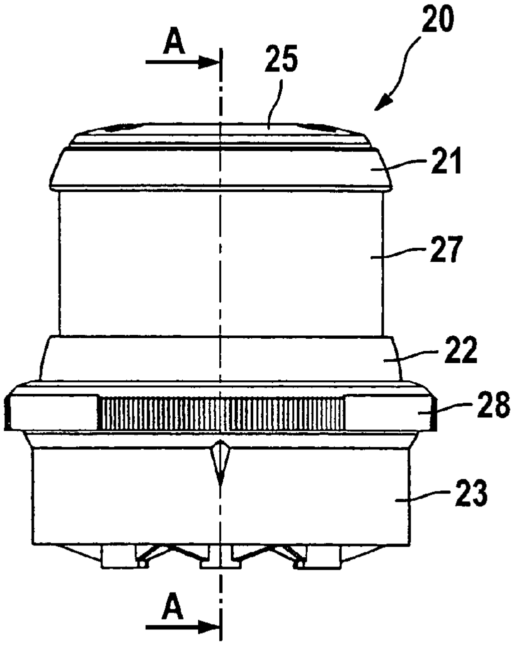
FIG. 1 shows a side view of a position lamp according to the invention, specifically a 3-color lamp.
Figure 2:
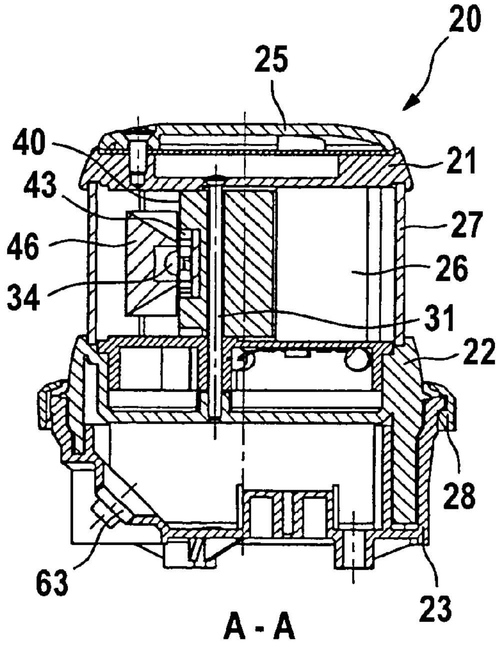
FIG. 2 shows a longitudinal section of the 3-color lamp in accordance with FIG. 1.
Figure 3:
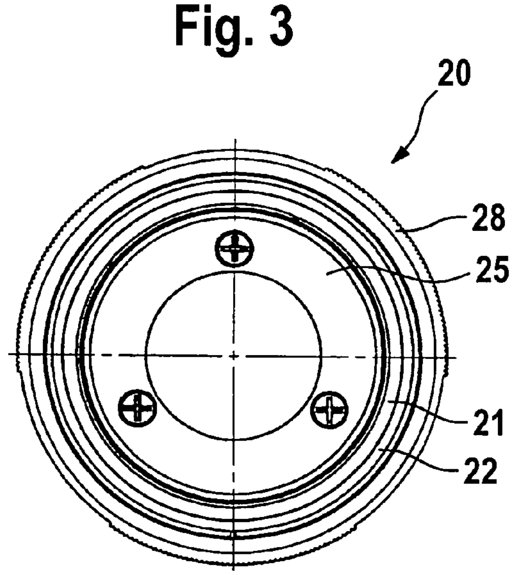
FIG. 3 shows a top view of the 3-color lamp in accordance with FIG. 1.

The construction of a novel position lamp, specifically a 3-color lamp for smaller watercraft, in particular, is firstly explained with the aid of FIGS. 1 to 5. The lamp 20 is of substantially cylindrical construction with a substantially disc-shaped upper part 21, a substantially pot-shaped lower part 22, a substantially pot-shaped base 23, a substantially disc-shaped insert 24, a substantially disc-shaped lid 25, and a housing body 26 as middle part. The housing body 26 is surrounded by a sleeve-shaped transparent cover 27.

The lower part 22 and base 23 are connected to one another by a bayonet ring 28 with an inserted seal 29. At the top, the lid 25 is screwed onto the upper part 21 with an interposed sealing disc 30 (or sealing mat).

Again, the upper part 21 and the lower part 22 are screwed to one another. Provided for this purpose at a central point is an axially aligned, continuous screw 31. The latter extends in this case through an axially directed bore 32 in the housing body 26, and likewise through a bore 33 in the insert 24. The transparent cover 27 between the lower part 22 and the upper part 21 is also held and fixed in depressions correspondingly running round at the edge by tightening the screw 31.

The housing body 26 is of substantially solid or semi-solid design and consists of aluminium or another material which is a good conductor of heat. The components further mentioned can also be designed to conduct heat in a correspondingly effective fashion.

Provided as light sources are a white LED 34, a red LED 35 and a green LED 36. The LEDs 34, 35 and 36 are seated on associated printed circuit boards 37, 38, 39.

The housing body 26 has a cross section which is substantially in the shape of an isosceles triangle. On the outside, the housing body 26 correspondingly has three support surfaces 40, 41, 42 angled away from one another.

The support surfaces 40, 41, 42 each have a recess 43, 44, 45 in which the associated printed circuit board 37, 38, 39 is respectively arranged. The printed circuit boards 37, 38, 39 are preferably encapsulated.

The recesses 43, 44, 45 have side edges matched to the outer shape of the printed circuit boards 37, 38, 39, thus giving rise to a unique positioning of the printed circuit boards in the recesses.

The light emitted by the LEDs 34, 35, 36 is focused by means of one preposed lens 46, 47, 48 in each case. The lenses bear on the outside against the support surfaces 40, 41, 42, have an outer shape that is substantially partially cylindrical, and are provided with projections 49, 50 which bear against corresponding side edges of the recesses 43, 44, 45, and thus define the position of the respective lens uniquely.

In addition, each lens can have an extension 51 which respectively extends next to the associated recess 43, 44, 45 into the interior of the housing body 26 and guides a portion of the emitted light. A dedicated light sensor can be provided for each extension 51 in the interior of the housing body 26 and be used to detect the luminous intensity output with lapse of time. An electronic circuit (not shown) can then be used to readjust the electric power of the LEDs individually in order to achieve a constant luminous intensity.

The housing body 26 respectively has one axially directed slot 52, 53, 54 each between the individual support surfaces 40, 41, 42. The slots are provided for accommodating screens 55, 56, 57.

Each screen 55, 56, 57 has a substantially T-shaped cross section with a middle plug-in extension 58 and two lateral covering extensions 59, 60. Each plug-in extension 58 is provided to be accommodated by the associated slot 52, 53, 54 and has corresponding dimensions. The covering extensions 59, 60 of the screen 56 cover side areas of the lenses 47, 48 for the port and starboard LEDs 35, 36. The emission angle is thereby accurately delimited in the principal direction of travel of the ship. Similarly, the lateral covering extensions 59, 60 of the lateral screens 55, 57 act on the one hand as screens for the lenses 47, 48, and on the other hand as screens for the lens 46 of the white LED 34, which functions as a stern light.

The covering extensions 59, 60 merge into one another and are designed in a curved fashion which corresponds, or is similar, to the curvature of the transparent cover 27. The latter allows the light of the LEDs to pass through and at the same time protects lenses, screens, LEDs and electronic components from external influences.

The housing body 26 is seated on the insert 24. The latter has bores 61 for the passage of electric leads via which the LEDs are supplied with current. The electric leads are not shown, and run from the rear side of the printed circuit boards 37, 38, 39 through corresponding cavities in the housing body 26 and through the abovementioned bores 61 as far as a rear side (not visible in FIG. 4) of the insert 24. There, a printed circuit board 62 is encapsulated with corresponding electronic components for supplying the LEDs.

Further electronic components can also be arranged in the base 23. The latter has a bore 63, directed obliquely downwards, for the passage of an electric lead.

In order to fix a precise relative position of the insert 24 with reference to the housing body 26, the insert 24 has slots 65, 66, 67 on its top side 64 which correspond to the extensions 58, 59, 60. The latter can interact at the same time with projections 68, 69, in the lower part 22, and thus fix the position of the insert 24 in the lower part 22.

Instead of the lid 25, a further position lamp, for example a top light, anchor light or allround light, can be arranged on the upper part 21. In the present case, a white signal lamp 70 (allround light) is provided. Its design is explained below with the aid of FIGS. 6 to 11.

The signal lamp 70 has a base 71, a dome-like base housing 72, a sleeve-shaped transparent cover 73 and a lid 74.

A printed circuit board 75 with a white LED 76 is held on the base 71 in a fashion protected by the base housing 72 lying above it. A top side 77 of the base 71 is provided with a mount 78 whose inner edge has projections and recesses and corresponds to matching projections and recesses on the printed circuit board 75, and thus ensures a unique position of the printed circuit board 75 on the base 71. The contour of the mount 78 corresponds to the cutouts 43, 44, 45. The outer shape of the printed circuit board 75 can therefore match the printed circuit boards 37, 38, 39.

The base housing 72 is held on, or connected to, the base 71 by axially directed screws. The base housing 72 also has an axially directed, middle bore 79 for accommodating or for passage of a cylindrical lens 80. The latter extends from the LED 76 up to the lid 74, and is provided at an upper end with a funnel-shaped depression 81 which has a wall 82 running round on the inside. The said wall simultaneously forms a reflective surface of the lens 80.

At an end of the lens 80 opposite the depression 81, that is to say in the region of the LED 76, the lens 80 has a cylindrical depression 83 which terminates with a convex light entry surface 84. The LED 76 dips into the depression 83 and is at only a slight distance from the light entry surface 84.

The depression 83 is delimited by a circumferential edge 85. The latter bears against parts of the printed circuit board 75 and justifies the relative position of the LED 76 with reference to the lens 80. In accordance with the predominantly solid, cylindrical shape of the lens 80, the latter has a circumferential cylindrical wall 86 as light exit surface. In the area of the cylindrical depression 83, the lens 80 has a conical outer shape such that the circumferential edge 85 has a distinctly smaller diameter than the circumferential wall 86.

In the area of the transition between the circumferential wall 86 and the conical area adjoining below the latter, the lens 80 has a circumferential collar 87. The latter bears internally against the base housing 72, and so only approximately ⅔ of the axial length of the circumferential wall 86 projects beyond the base housing 72 in the direction of the lid 74.

The light emitted by the LED 76 passes through the convex light entry surface 84 into the solid lens 80, is reflected at the wall 82, and exits via the circumferential wall 86, specifically in a fashion substantially perpendicular to the principal direction of emission of the LED 76. Subsequently, the light still transits merely the transparent cover 73 and, beforehand, the space between the latter and the lens 80.

The lid 74 is provided with a circumferential extension 88 which is axially directed and bears against the circumferential wall 86, specifically in the area of the transition to the funnel-shaped wall 82. For this purpose, the circumferential extension 88 has a somewhat wider outside diameter than the circumferential wall 86, and is provided with an inwardly directed step such that the circumferential wall 86 is secured in this area against transaxial movements. The contact also enables heat to be exported from the lens 80 into the lid 74.

The lens 80 and/or transparent cover 73 are/is connected by bonding to the lid 74, on the one hand, and to the base housing 72, on the other hand.

A printed circuit board with the required electronic circuits is arranged on an underside of the base 71. Power is supplied via leads 90 which are guided from the printed circuit board 89 in the direction of the 3-color lamp lying thereunder. The upper part 21, housing body 26 and insert 24 have the additional lead bushings necessary therefor.

Since the signal lamp 70 is provided instead of the lid 25, the base housing 72 has leadthroughs for screws in a fashion similar to the fastening of the lid 25.

Figure 4:
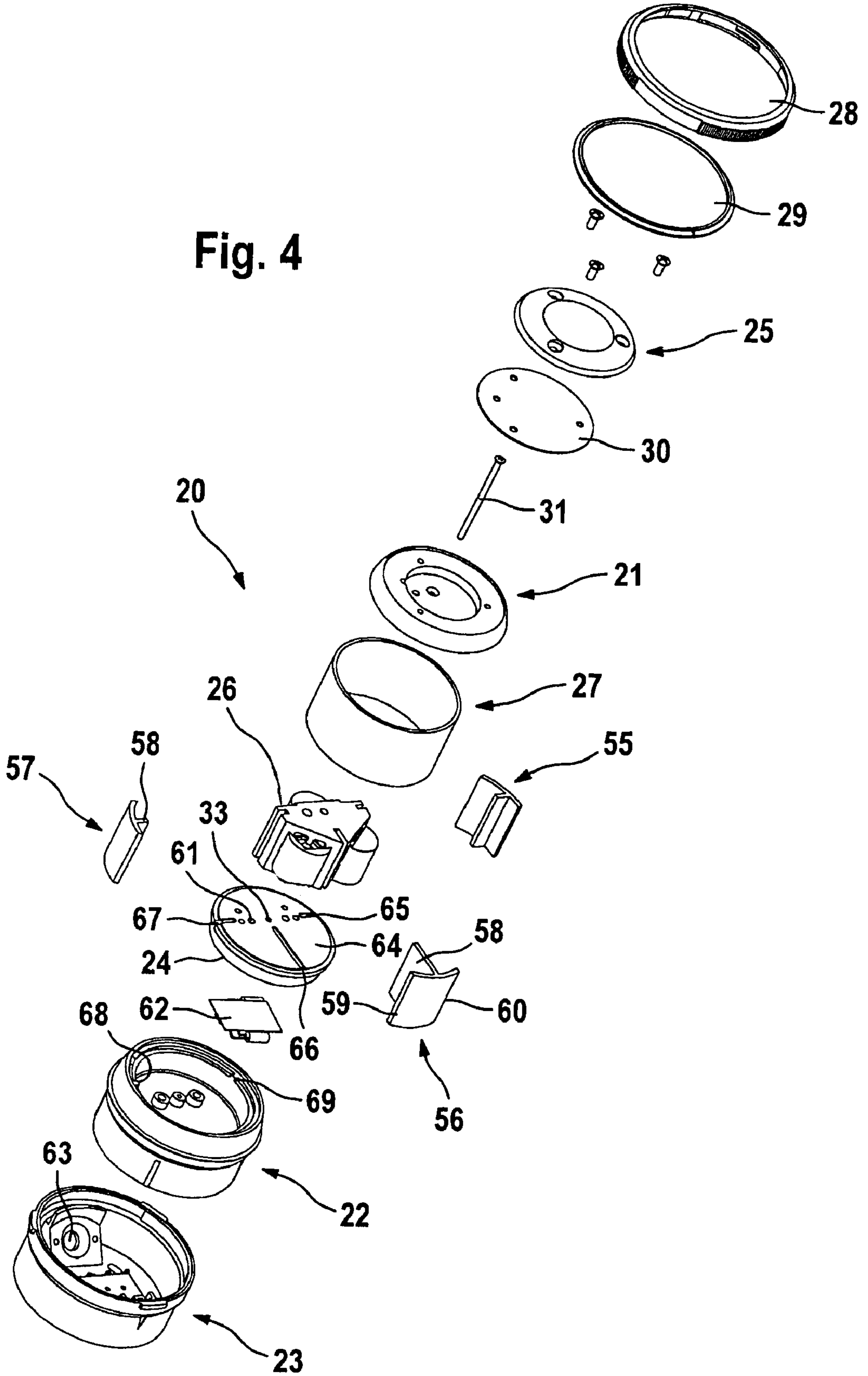
FIG. 4 shows an exploded illustration of the individual components of the 3-color lamp in accordance with FIG. 1.
Figure 5:
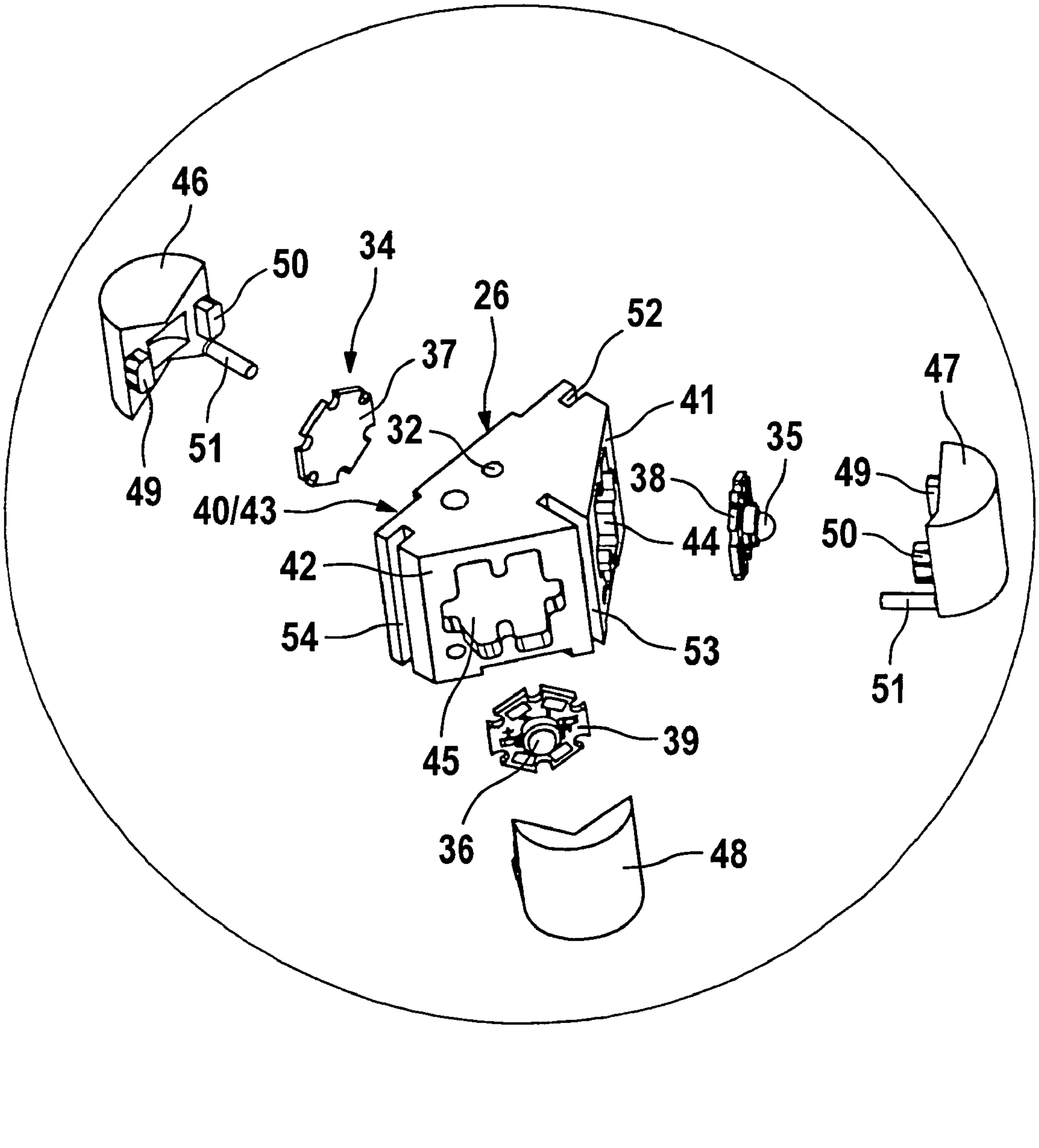
FIG. 5 shows an exploded illustration of further parts of the 3-color lamp in accordance with FIG. 1, specifically a housing body with screens and LEDs on printed circuit boards.
Figure 7:
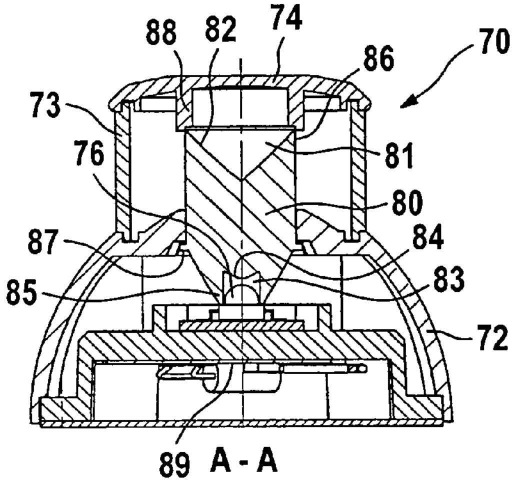
FIG. 7 shows a longitudinal section through the position lamp in accordance with FIG. 6.
Figure 6:
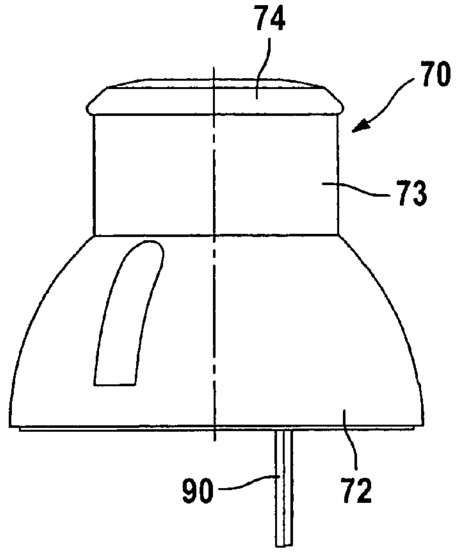
FIG. 6 shows a side view of a further position lamp according to the invention.
Figure 8:
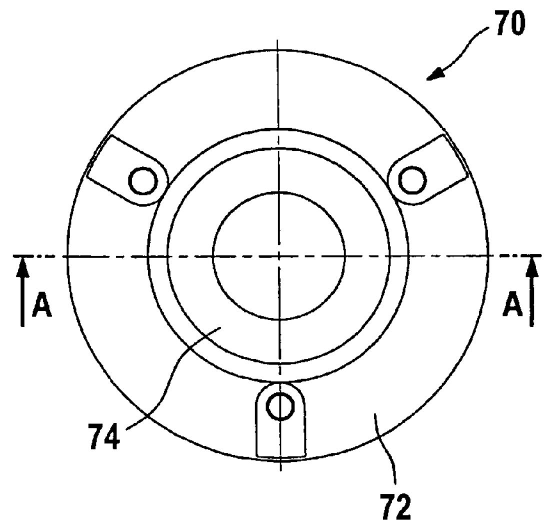
FIG. 8 shows a top view of the position lamp in accordance with FIG. 6.
Figure 9:
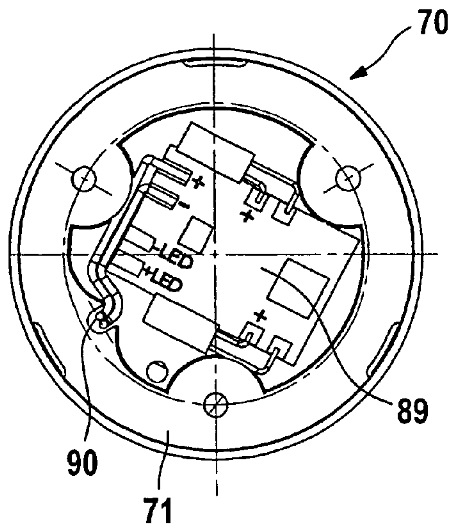
FIG. 9 shows a bottom view of the position lamp in accordance with FIG. 6.
Figures 10, 11:
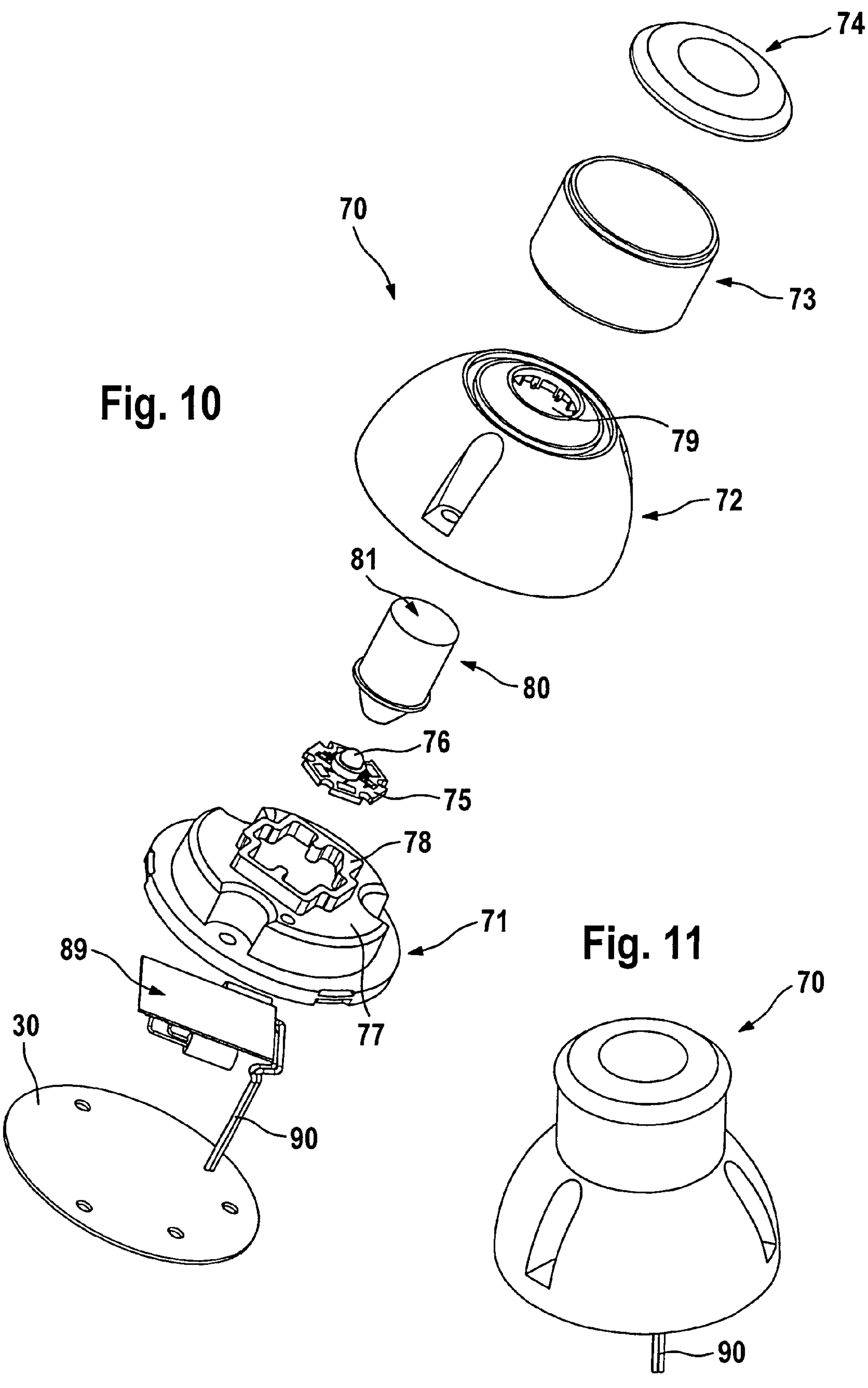
FIG. 10 shows an exploded illustration of the position lamp in accordance with FIG. 6.
FIG. 11 shows a perspective illustration of the position lamp in accordance with FIG. 6, specifically obliquely from above.
Figure 14:
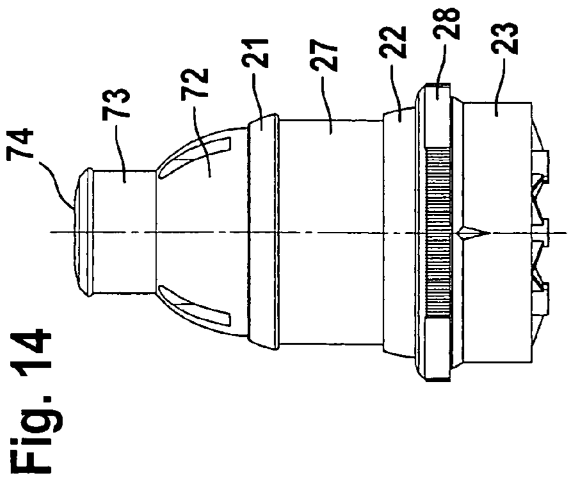
FIG. 14 shows a side view offset by 90° from the illustration in FIG. 12.
Figure 13:
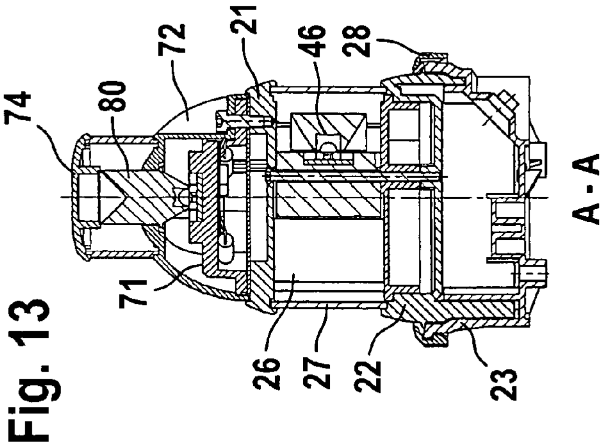
FIG. 13 shows a longitudinal section through the combined position lamp in accordance with FIG. 12.
Figure 12:
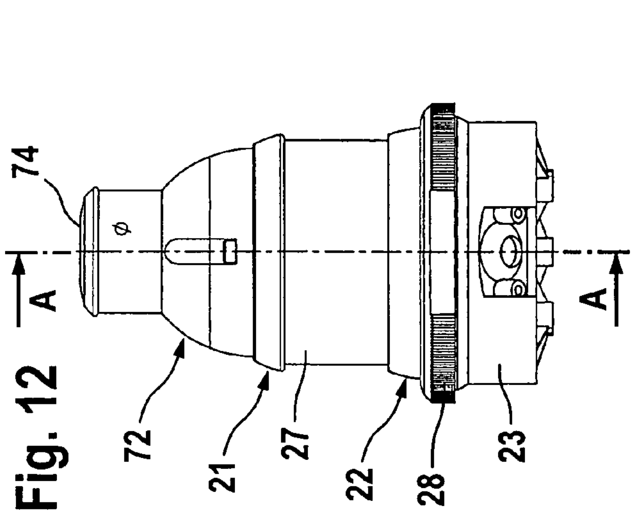
FIG. 12 shows a side view of a combination of the two position lamps in accordance with FIGS. 1 and 6.
Figure 15:
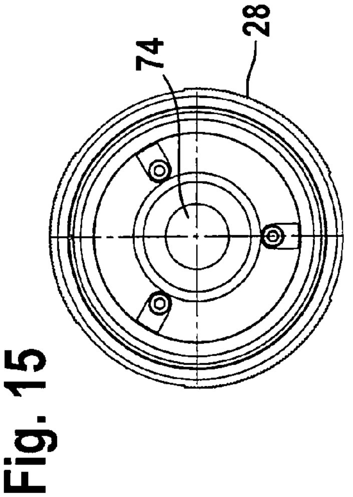
FIG. 15 shows a top view of the combined position lamp in accordance with FIG. 12.
Figure 16:
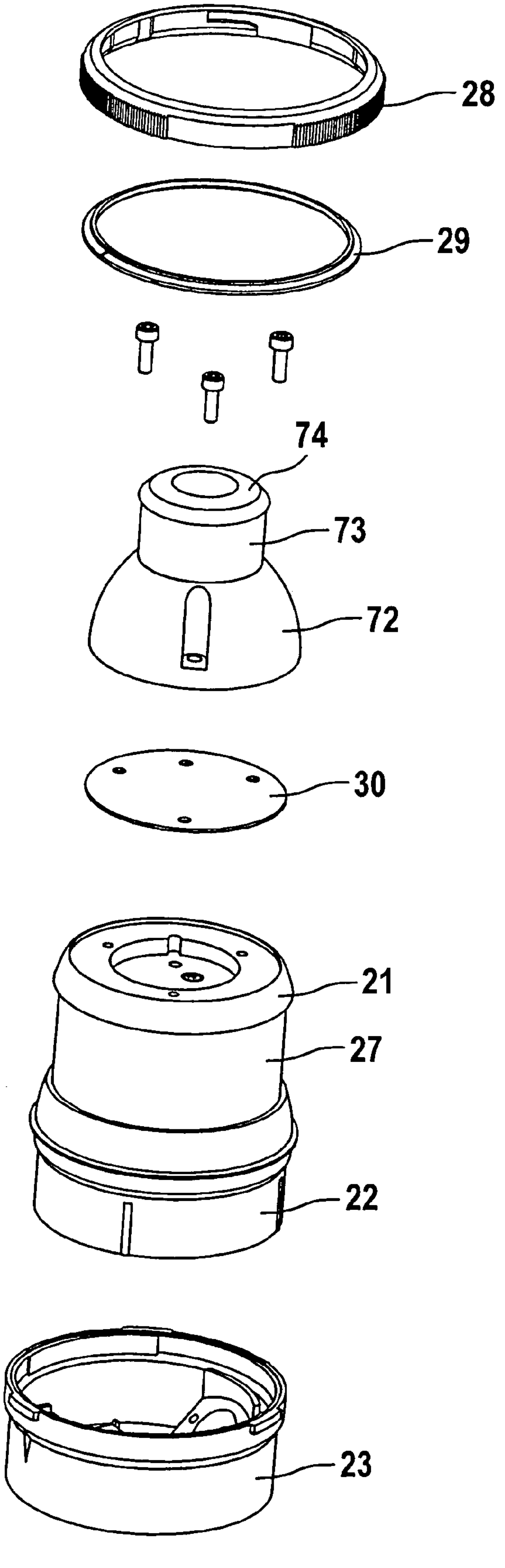
FIG. 16 shows an exploded illustration of the combined position lamp in accordance with FIG. 12.

The sealing disc 30 in accordance with FIG. 10 is also shown in FIG. 4, consists of rubber and has an insulating effect here (see FIG. 7, in particular) between the base 71 and the upper part 21 depicted in FIG. 4.

FIGS. 12 to 16 show a position lamp as a combination of the above-described 3-colour lamp 20 and the signal lamp 70. Despite the highly integrated design, the combination is simple in structure and its electrical functioning. The option of producing the described combination of 3-colour lamp and signal lamp or only the 3-colour lamp can be exercised on the basis of the same design by a simple modification, specifically by exchanging the signal lamp 70 for the lid 25.

It remains possible to access the electric terminals easily owing to the bayonet ring 28, already mentioned above, which permits the upper part 21 and base 23 to be separated from one another.

LIST OF REFERENCE NUMERALS

| | |
|---|---|
| 20 | 3-color lamp |
| 21 | Upper part |
| 22 | Lower part |
| 23 | Base |
| 24 | Insert |
| 25 | Lid |
| 26 | Housing body |
| 27 | Transparent cover |
| 28 | Bayonet ring |
| 29 | Seal |
| 30 | Sealing disc |
| 31 | Screw |
| 32 | Bore |
| 33 | Bore |
| 34 | White LED |
| 35 | Red LED |
| 36 | Green LED |
| 37 | Printed circuit board |
| 38 | Printed circuit board |
| 39 | Printed circuit board |
| 40 | Support surface |
| 41 | Support surface |
| 42 | Support surface |
| 43 | Recess |
| 44 | Recess |
| 45 | Recess |
| 46 | Lens |
| 47 | Lens |
| 48 | Lens |
| 49 | Projection |
| 50 | Projection |
| 51 | Extension |
| 52 | Slot |
| 53 | Slot |
| 54 | Slot |
| 55 | Screen |
| 56 | Screen |
| 57 | Screen |
| 58 | Plug-in extension |
| 59 | Covering extension |
| 60 | Covering extension |
| 61 | Bore |
| 62 | Printed circuit board |
| 63 | Bore |
| 64 | Top side |
| 65 | Slot |
| 66 | Slot |
| 67 | Slot |
| 68 | Projection |
| 69 | Projection |
| 70 | Signal lamp |
| 71 | Base |
| 72 | Base housing |
| 73 | Transparent cover |
| 74 | Lid |
| 75 | Printed circuit board |
| 76 | LED |
| 77 | Top side |
| 78 | Mount |
| 79 | Bore |

-continued

| | |
|---|---|
| 80 | Lens |
| 81 | Depression (V-shaped) |
| 82 | Wall |
| 83 | Depression (cylindrical) |
| 84 | Light entry surface |
| 85 | Circumferential edge |
| 86 | Circumferential wall |
| 87 | Bore |
| 88 | Extension |
| 89 | Printed circuit board |
| 90 | Leads |

The invention claimed is:

1. A position lamp for watercraft or for placing ashore, comprising:

(a) a plurality of light sources that emit light in at least two different directions, with at least one of the plurality of light sources per each of the at least two different directions, (b) a plurality of dedicated optically refractive elements, with one of the dedicated optically refractive elements provided per each of the light sources, wherein light emitted from each of the light sources passes through a respective one of the dedicated optically refractive elements, (c) a common housing body, the common housing body accommodating the light sources and the dedicated optically refractive elements, and (d) a plurality of dedicated support surfaces, with one of the dedicated support surfaces provided for each of the dedicated optically refractive elements, wherein the dedicated support surfaces are arranged on the common housing body at an angle to one another and the dedicated support surfaces each have a recess or depression located approximately in the middle of the dedicated support surfaces, wherein the common housing body has a cross-section that is substantially in the shape of an isosceles triangle having three of the dedicated support surfaces angled away from one another, with each of the three support surfaces being assigned one of the dedicated optically refractive elements and one of the light sources.

2. The position lamp according to claim 1, wherein the optically refractive elements have projections (49, 50) which enter the recess (43, 44, 45) or depression that ensure the arrangement of the optically refractive elements in defined positions relative to the common housing body (26).

3. The position lamp according to claim 2, wherein each of the plurality of light sources is a single LED (34, 35, 36), with each LED is seated on an associated printed circuit board (37, 38, 39), and with each of the printed circuit boards is arranged in an associated one of the recesses (43, 44, 45).

4. The position lamp according to claim 1, further comprising screens (55, 56, 57) for covering side areas of the optically refractive elements.

5. The position lamp according to claim 4, wherein at least one of the screens is arranged between two of the optically refractive elements and covers neighbouring side areas of these two of the optically refractive elements.

6. The position lamp according to claim 5, wherein the recesses located in the common housing body (26) between the dedicated support surfaces (40, 41, 42) accommodate projections provided on the screens (55, 56, 57).

7. The position lamp according to claim 6, wherein the recesses between the dedicated support surfaces (40, 41, 42) are slots (52, 53, 54), and the projections are extensions (58).

8. The position lamp according to claim 1, further comprising a heat sink located below or above, and bearing against, the common housing body (26).

9. The position lamp according to claim 8, wherein the heat sink (24) comprises recesses or slots (65, 66, 67) for the entry of parts of screens (55, 56, 57).

10. The position lamp according to claim 1, wherein the common housing body (26) is of a solid or semi-solid design.

11. A position lamp for watercraft or for placing ashore, comprising:

(a) a plurality of light sources that emit light in at least two different directions, with at least one of the plurality of light sources per each of the at least two different directions, (b) a plurality of dedicated optically refractive elements, with one of the dedicated optically refractive elements provided per each of the light sources, wherein light emitted from each of the light sources passes through a respective one of the dedicated optically refractive elements, (c) a common housing body, the common housing body accommodating the light sources and the dedicated optically refractive elements, (d) screens for covering side areas of the optically refractive elements, and (e) a plurality of dedicated support surfaces, with one of the dedicated support surfaces provided for each of the dedicated optically refractive elements, wherein the dedicated support surfaces are arranged on the common housing body at an angle to one another, wherein, between the dedicated support surfaces, the housing body further comprises recesses for accommodating projections provided on the screens, wherein the recesses between the dedicated support surfaces are slots, and the projections are extensions.

12. A position lamp for watercraft or for placing ashore, comprising:

(a) a plurality of light sources that emit light in at least two different directions, with at least one of the plurality of light sources per each of the at least two different directions, (b) a plurality of dedicated optically refractive elements, with one of the dedicated optically refractive elements provided per each of the light sources, wherein light emitted from each of the light sources passes through a respective one of the dedicated optically refractive elements, (c) a common housing body, the common housing body accommodating the light sources and the dedicated optically refractive elements, (d) screens for covering side areas of the optically refractive elements, wherein at least one of the screens has a T-shaped cross section with an extension as a section of the screens and two covering extensions as other sections of the screens, and (e) a plurality of dedicated support surfaces, with one of the dedicated support surfaces provided for each of the dedicated optically refractive elements, wherein the dedicated support surfaces are arranged on the common housing body at an angle to one another.

13. A position lamp for watercraft or for placing ashore, comprising:

(a) a plurality of light sources that emit light in at least two different directions, with at least one of the plurality of light sources per each of the at least two different directions, (b) a plurality of dedicated optically refractive elements, with one of the dedicated optically refractive elements provided per each of the light sources, wherein light emitted from each of the light sources passes through a respective one of the dedicated optically refractive elements, (c) a common housing body, the common housing body accommodating the light sources and the dedicated optically refractive elements, (d) a plurality of dedicated support surfaces, with one of the dedicated support surfaces provided for each of the dedicated optically refractive elements, wherein the dedicated support surfaces are arranged on the common housing body at an angle to one another, (e) a light exit, substantially across a plane, which is circumferential and covers at least a wide angle, and (f) an LED as light source, the LED being arranged with a principal radiation direction perpendicular to the light exit plane, wherein the dedicated optically refractive elements are for deflecting and distributing light from the light source, the dedicated optically refractive elements are of solid cylindrical design and comprise a light entry surface at one end, a circumferential light exit surface, and a reflective surface opposite the light entry surface, wherein the reflective surface is formed by a funnel-shaped/V-shaped depression at an end of the dedicated optically refractive elements opposite the light entry surface.

14. The position lamp according to claim 13, wherein the light entry surface (84) is of convex design.

15. The position lamp according to claim 13, wherein the light entry surface (84) is located at the bottom of a cylindrical depression (83) in the optically refractive element, and the LED (76) is located at least partially in the depression (83).

16. The position lamp according to claim 13, further comprising an opaque lid (74) covering the optically refractive element at the end opposite the light entry surface (84), wherein the opaque lid is a circumferential covering wall (88) bearing against a circumferential free edge of the funnel-shaped/V-shaped depression (81).

17. A position lamp for watercraft or for placing ashore, comprising:

(a) a plurality of light sources that emit light in at least two different directions, with at least one of the plurality of light sources per each of the at least two different directions, (b) a plurality of dedicated optically refractive elements, with one of the dedicated optically refractive elements provided per each of the light sources, wherein light emitted from each of the light sources passes through a respective one of the dedicated optically refractive elements, (c) a common housing body, the common housing body accommodating the light sources and the dedicated optically refractive elements, (d) a plurality of dedicated support surfaces, with one of the dedicated support surfaces provided for each of the dedicated optically refractive elements, wherein the dedicated support surfaces are arranged on the common housing body at an angle to one another, (e) a light exit, substantially across a plane, which is circumferential and covers at least a wide angle, and (f) an LED as light source, the LED being arranged with a principal radiation direction perpendicular to the light exit plane, wherein the common housing body has a cross-section that is substantially in the shape of an isosceles triangle having three of the dedicated support surfaces angled away from one another, with each of the three support surfaces being assigned one of the dedicated optically refractive elements and one of the light sources, and wherein the dedicated optically refractive elements are for deflecting and distributing the light, the dedicated optically refractive elements are of solid cylindrical design and comprise a light entry surface at one end, a circumferential light exit surface, and a reflective surface opposite the light entry surface, wherein the reflective surface is formed by a funnel-shaped/V-shaped depression at an end of the dedicated optically refractive elements opposite the light entry surface.

18. The position lamp according to claim 17, wherein the light entry surface (84) is of convex design.

19. The position lamp according to claim 18, wherein the light entry surface (84) is located at the bottom of a cylindrical depression (83) in the optically refractive element, and the LED (76) is located at least partially in the depression (83).

20. The position lamp according to claim 17, wherein the light entry surface (84) is located at the bottom of a cylindrical depression (83) in the optically refractive element, and the LED (76) is located at least partially in the depression (83).

21. The position lamp according to claim 17, further comprising an opaque lid (74) covering the optically refractive element at the end opposite the light entry surface (84), wherein the opaque lid is a circumferential covering wall (88) bearing against a circumferential free edge of the funnel-shaped/V-shaped depression (81).

* * * * *